US009729306B2

(12) United States Patent
Zarifi et al.

(10) Patent No.: US 9,729,306 B2
(45) Date of Patent: Aug. 8, 2017

(54) METHOD AND SYSTEM FOR TIME DIVISION DUPLEX COMMUNICATION IN WIRELESS NETWORKS

(71) Applicants: Keyvan Zarifi, Ottawa (CA); Mohammadhadi Baligh, Ottawa (CA); Jianglei Ma, Ottawa (CA)

(72) Inventors: Keyvan Zarifi, Ottawa (CA); Mohammadhadi Baligh, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 14/573,737

(22) Filed: Dec. 17, 2014

(65) Prior Publication Data

US 2016/0182212 A1     Jun. 23, 2016

(51) Int. Cl.
| | |
|---|---|
| *H04L 1/00* | (2006.01) |
| *H04L 5/14* | (2006.01) |
| *H04W 28/02* | (2009.01) |
| *H04W 40/24* | (2009.01) |
| *H04W 72/04* | (2009.01) |
| *H04W 74/00* | (2009.01) |
| *H04W 88/02* | (2009.01) |
| *H04W 88/06* | (2009.01) |
| *H04W 72/02* | (2009.01) |
| *H04W 72/08* | (2009.01) |

(52) U.S. Cl.
CPC ....... *H04L 5/1438* (2013.01); *H04W 28/0236* (2013.01); *H04W 40/244* (2013.01); *H04W 72/0446* (2013.01); *H04W 74/002* (2013.01); *H04W 72/02* (2013.01); *H04W 72/082* (2013.01); *H04W 88/02* (2013.01); *H04W 88/06* (2013.01)

(58) Field of Classification Search
CPC ......... H04W 72/0446; H04W 72/0447; H04W 72/0448; H04W 74/04; H04W 74/05; H04B 7/2643; H04B 7/2644; H04B 7/2645; H04B 7/2646
USPC .......................... 370/336, 337, 338, 344, 347
See application file for complete search history.

(56) References Cited

U.S. PATENT DOCUMENTS

| | | | |
|---|---|---|---|
| 2014/0153454 A1 | 6/2014 | Samdanis et al. | |
| 2014/0334355 A1* | 11/2014 | Ekpenyong | H04B 1/56 370/280 |
| 2015/0117273 A1 | 4/2015 | Xu et al. | |

FOREIGN PATENT DOCUMENTS

| | | |
|---|---|---|
| CN | 103384179 A | 11/2013 |
| CN | 103733695 A | 4/2014 |

OTHER PUBLICATIONS

InterDigital Tx Power Control for eIMTA 3 GPP TSG-RAN WG1 Meeting #72bis, R1-131340, Apr. 6, 2013.

(Continued)

*Primary Examiner* — Dady Chery

(57) ABSTRACT

A method of simultaneous bidirectional transmissions, the method comprising determining, by a network element, first transmission time slots for downlink and uplink transmissions for a first plurality of user equipment (UEs); assigning a DL transmission to a first shared time slot of the first transmission time slots for a first UE in the first plurality of UEs; and assigning an UL transmission to the first shared time slot for a second UE in the first plurality of UEs, wherein the first and second UEs form a virtual UE to communicate in virtual full duplex in at least the first shared time slot.

28 Claims, 10 Drawing Sheets

(56) References Cited

OTHER PUBLICATIONS

PCT International Search Report and Written Opinion, PCT/CN2015/095887, Feb. 26, 2016, 11 pages.

* cited by examiner

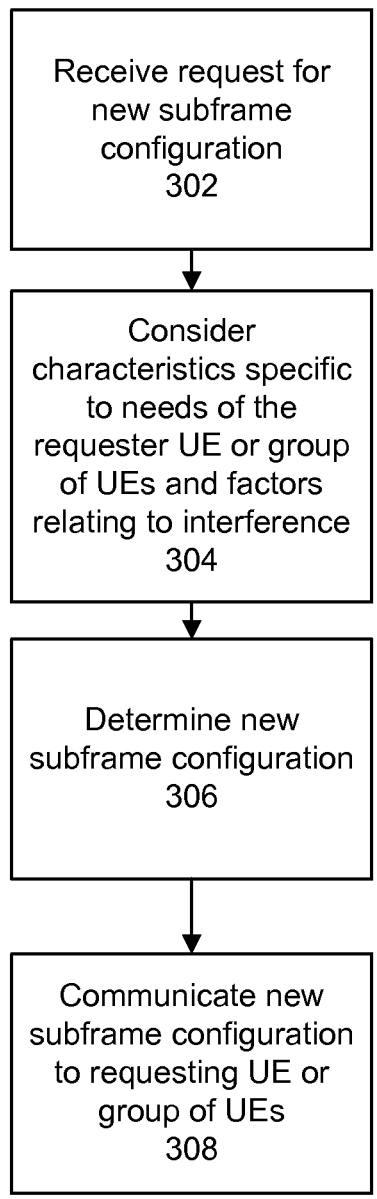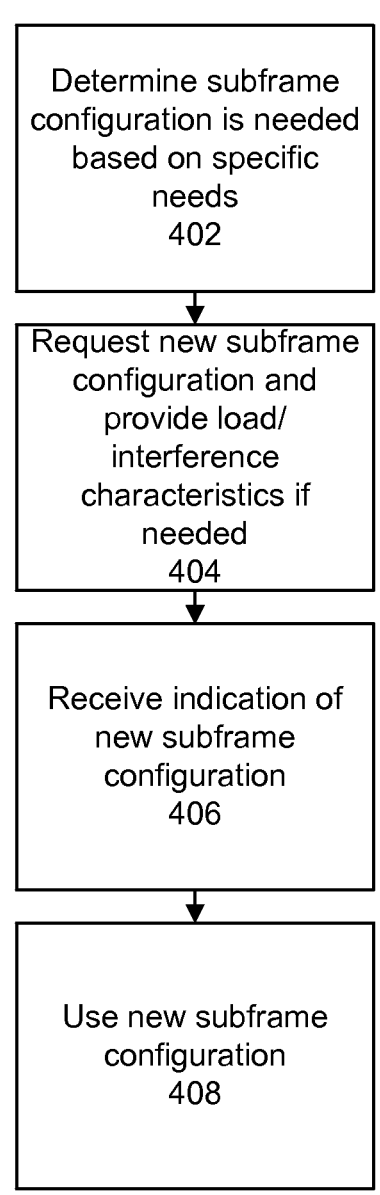
FIG. 3
FIG. 4

METHOD AND SYSTEM FOR TIME DIVISION DUPLEX COMMUNICATION IN WIRELESS NETWORKS

TECHNICAL FIELD

The present disclosure relates to a system and method for wireless communications, and, in particular, to a system and method for virtual full time division duplex communication.

BACKGROUND

Of the two forms of duplex commonly used in wireless networks, namely frequency division duplex (FDD) and time division duplex (TDD), current Long-Term Evolution (LTE) standards accommodate both FDD (LTE FDD) and TDD (LTE TDD) implementations in half duplex mode. Interference, caused by both a user equipment (UE) itself, as well as inter-terminal interference, present obstacles to implementations of full-duplex communication.

Currently, for all transmission between UEs and base stations, the timeline for a downlink and an uplink transmission is partitioned into units of radio frames. Each radio frame is partitioned into a predetermined number of subframes. For TDD, each subframe used for the downlink may be referred to as a downlink (DL) subframe, and each subframe used for the uplink may be referred to as an uplink (UL) subframe.

A particular TDD DL/UL subframe configuration is associated with a network, a cell or a cluster of cells. In current implementations, such as LTE, the subframe configuration is shared amongst a large number of cells over a larger geographical region. Further, subframe configurations are selected from a limited set of DL/UL subframe permutations. The network usually determines the subframe configuration based on an average need of all UEs in that region. Once chosen, the particular frame configuration is used to serve all UEs belonging to the region, sometimes termed fixed TDD. Thus, the network has centralized control over the frame configuration applied to all UEs served by the network. In other words to avoid base station (BS) to base station (BS-BS) interference and UE-UE inter-cell interference, all TDD deployments typically operate synchronously.

Revisions to the LTE standard include the possibility of dynamically adapting TDD DL/UL subframe configurations based on the actual traffic needs, termed flexible TDD. The revisions allow mutually different subframe configurations across neighboring cells or neighboring clusters of cells. For example, during a short duration, a large data burst on the downlink may be needed; all the UEs served by a particular cell may be instructed by the serving node to change their configuration from one of the known configurations to another predetermined configuration. While flexible TDD may provide more efficient use of resources resulting in UL and DL throughput gain, it may cause interference to both DL and UL transmission when the cells have different overlapping DL and UL subframes, usually at the cell boundary. This inter-layer (DL2UL and UL2DL) interference may significantly affect the overall system performance. Various interference mitigation (IM) techniques may be implemented, such as scheduling dependent IM (SDIM) and cell clustering IM (CCIM). Traffic adaptation (TA) techniques may also be used, that is, proper choice of subframe configuration.

While Flexible TDD is an improvement over fixed TDD in terms of network spectral efficiency and efficient radio resource usage, both techniques are still inefficient in that individual UEs may have needs for DL and UL subframes in proportions that do not correspond to the configuration of the cell. Further, in practical non-full buffer/bursty traffic, some subframes or other network resources may not be fully utilized. Also, for most networks, once a subframe configuration is set, it is generally fixed among geographically adjacent cells over a longer duration even though, as described above, this may compromise spectral efficiency and efficient radio resource usage. Further as described above, interference, caused by both a UE, as well as inter-terminal interference, present obstacles to implementations of full-duplex communication.

SUMMARY

The present disclosure provides a method of simultaneous bidirectional transmissions, the method comprising determining, by a network element, first transmission time slots for downlink and uplink transmissions for a first plurality of user equipment (UEs); assigning a DL transmission to a first shared time slot of the first transmission time slots for a first UE in the first plurality of UEs; and assigning an UL transmission to the first shared time slot for a second UE in the first plurality of UEs.

The present disclosure further provides a network element comprising a memory; and a processor, the processor coupled with the memory to: determine, by a network element, first transmission time slots for downlink and uplink transmissions for a first plurality of user equipment (UEs); assign a DL transmission to a first shared time slot of the first transmission time slots for a first UE in the first plurality of UEs; and assign an UL transmission to the first shared time slot for a second UE in the first plurality of UEs.

In another aspect of the present disclosure the method provides, for determining second transmission time slots for downlink and uplink transmissions for a second plurality of UEs wherein at least one time slot in the second transmission time slots is shared with a time slot in the first transmission time slots of the first plurality of UEs.

BRIEF DESCRIPTION OF THE DRAWINGS

The present disclosure will be better understood with reference to the drawings, in which:

FIG. 3 is a functional block diagram illustrating example blocks executed by a network element to implement one aspect of the present disclosure;

FIG. 4 is a functional block diagram illustrating example blocks executed to implement another aspect of the present disclosure;

DETAILED DESCRIPTION OF THE DRAWINGS

Figure 1:
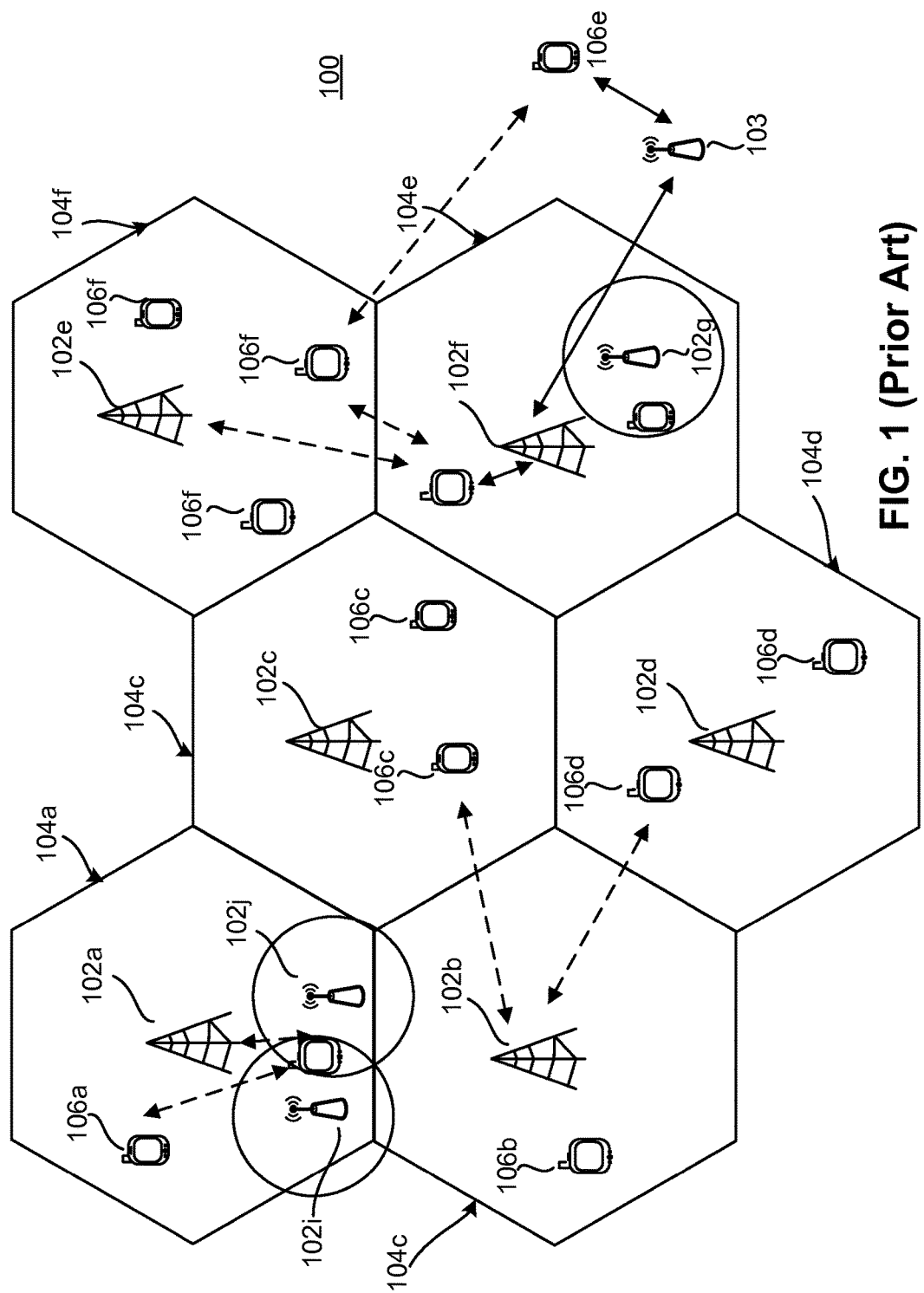
FIG. 1 is a block diagram illustrating an example of a wireless communication system.

The techniques described herein may be used for the wireless networks and radio access technologies mentioned above, as well as other wireless networks and radio access technologies. The present disclosure is not limited to any particular wireless technology or standard. The use of LTE in the examples below is merely for illustration of a current network implementation. Though current network implementations are based on cell to UE communications. The concept of a cell, and cell association, may become obsolete in future networks, such as fifth generation (5G) networks currently being designed by the Third Generation Partnership Project (3GPP). Instead each UE may be served by multiple transmit points (TPs) as 5G and future networks may be based on communication between a group of TPs and a group of UEs. Further embodiments of the present disclosure may be described below in reference to subframe configurations. However, such embodiments may equally well be applicable to any time slot based radio transmission. In other words the term subframe may be substituted with the term time slot or vice versa.

Accordingly, embodiments of the present disclosure provide for methods and systems for a virtual full duplex (VFD) TDD communication wherein neighboring UEs communicate in respective uplink and downlink directions in a same resource unit.

In the present disclosure the term resource unit is meant to include any transmission spectrum allocation in a transmission time interval (TTI) (or time slot).

Embodiments of the present disclosure further provide for methods and systems wherein a configuration of time slots is based on specific needs of an individual UE or a group of collaborating UEs, and where each UE or group of UEs may have its own associated time slot configuration.

Embodiments of the present disclosure further provide for the configuration of time slots to comprise a sequence of one or more types of time slots.

The methods and systems of the present disclosure also provide for changes in the time slot configurations of an individual UE as the UE's traffic load, traffic type or inter-UE communication status changes.

Embodiments of the present disclosure may be applied to networks that communicate based on groups of transmit points (TPs) to groups of UEs, rather than cells and UEs associated to a particular cell.

The methods and systems of the present disclosure further provide for a virtual full duplex TDD communication between a group or groups of cooperative TPs (virtual TP (VTP)) and a group or groups of cooperating UEs (virtual UE (VUE)) while each individual UE and TP provides half duplex TDD communication in regular non-carrier-aggregation (non-CA) or contiguous CA systems.

Further, methods and systems of the present disclosure provide for coordination and interference management techniques. The techniques may include one or more VTPs, where one or more TPs coordinate communication with UEs and manage interference. This coordination may be performed in higher levels of network and passed to the TPs in the VTP or this coordination may be performed by one or more VUEs where one or more UEs in a VUE coordinate communication with the network and manage interference. Interference management may also include multiuser diversity techniques wherein UEs are scheduled in different resources to maximize one or more performance metrics. Further interference management techniques of the present disclosure may be used with massive multiple-input multiple-output (MIMO) which facilitates narrow DL/UL beam forming and consequently substantial interference reduction.

In one aspect, embodiments of the present disclosure may be applied to current networks using a subframe in a radio frame structure and wherein VFD communication is enabled by having a UE-specific frame structure comprising a sequence of subframe types where the frame structure of one UE could be different from that of a neighboring UE, facilitating simultaneous communication of uplink subframes and downlink subframes with the respective UEs.

Some embodiments further provide for the subframe configuration to be based on specific needs of an individual UE or a group of collaborating UEs, and where each UE or group of UEs may have its own associated subframe configuration. Some embodiments also provide for changes in the subframe configuration of an individual UE as the UE's traffic load, traffic type or inter-UE communication status changes.

The systems and methods of the present disclosure may be implemented on any one or combination of network elements.

The present disclosure provides in one aspect a network element comprising: a memory; and a processor, the processor coupled with the memory to: determine, by a network element, first transmission time slots for downlink and uplink transmissions for a first plurality of user equipment (UEs); assign a DL transmission to a first shared time slot of the first transmission time slots for a first UE in the first plurality of UEs; and assign an UL transmission to the first shared time slot for a second UE in the first plurality of UEs.

In another aspect the network element is a base station.

In another aspect the network element is a UE.

In another aspect the network element is a central controller.

In another aspect the network element is further configured to provide to a first transmission point (TP) and a second TP in a first plurality of TPs, the determined first transmission time slots for use by the first TP in transmitting a downlink (DL) signal to the first UE in the first shared time slot assigned for DL transmission and for use by the second TP in receiving an UL signal in the first shared time slot from the second UE.

In another aspect the network element is further configured to provide the determined first transmission time slots to the first plurality of UEs.

In another aspect the network element is further configured to designate a first TP and a second TP in a first plurality of TPs to collaborate in the assigned UL and assigned DL transmission.

In another aspect the network element is further configured to monitor collaboration between the first TP and a the second TP.

In another aspect the network element is further configured to coordinate interference mitigation (IM) between the first UE and the second UE.

In another aspect the network element is further configured to monitor the first TP and the second TP to coordinate interference mitigation (IM) between the first UE and the second UE.

In another aspect the network element is further configured to determine second transmission time slots for downlink and uplink transmissions for a second plurality of UEs wherein at least one time slot in the second transmission time slots is shared with a time slot in the first transmission time slots of the first plurality of UEs.

In another aspect the network element is further configured to: assign a DL transmission to the shared time slot for the second plurality of UEs; and assign an UL transmission to the shared time slot for the first plurality of UEs.

In another aspect the network element is further configured to provide the second transmission time slots to the second plurality of UEs.

In another aspect the network element is further configured to provide to a second plurality of TPs, the determined second transmission time slots for use by the second plurality of TPs in communicating with the second plurality of UEs.

In another aspect the network element is further configured to monitor collaboration between the first plurality of TPs and the second plurality of TPs.

In another aspect the network element is further configured to coordinate interference mitigation (IM) between the first plurality of UEs and the second plurality of UEs.

In another aspect the network element is further configured to coordinate interference mitigation (IM) between the first plurality of TPs and the second plurality of TPs.

In another aspect the network element a configuration of the downlink and uplink transmission time slots is based on factors associated with a UE and selected from one or more of down link to uplink (DUUL) traffic load ratio of the UE, device-to-device (D2D) communication of the UE and the UE traffic type.

In another aspect the network element is the traffic type is selected from one or more of delay sensitivity of communicated data, maximum allowed delay for retransmission (reTX) and burstiness.

In another aspect the network element is further configured to determine time slots for: one or more of broadcast or multicast channels; pilot transmissions for DL measurement; and common control channels.

In another aspect the network element is further configured to determine special time slots selected from one or more of device-to-device (D2D) time slots for inter UE communication, auxiliary time slots for DL/UL/D2D communication, and muted time slots for interference mitigation (IM), measurements and power saving.

The present disclosure provides in one aspect computer program product for wireless communications in a wireless network, comprising: a non-transitory computer-readable medium having program code recorded thereon, the program code including: program code for causing a computer to determine, by a network element, first transmission time slots for downlink and uplink transmissions for a first plurality of user equipment (UEs); assign a DL transmission to a first shared time slot of the first transmission time slots for a first UE in the first plurality of UEs; and assign an UL transmission to the first shared time slot for a second UE in the first plurality of UEs.

As described above, aspects of the present disclosure may be implemented in current radio frame centric cell based networks. Accordingly, FIG. 1 shows a typical cell based wireless network 100, which may, for example, be an LTE network. The wireless network 100 includes a number of evolved nodeBs (eNBs) 102, shown in FIG. 1 as eNBs 102a to 102j. Wireless network 100 may further include other network entities. An eNB may be a station that communicates with the UEs and may also be referred to as a base station, a node B, an access point, and the like.

Each eNB 102 may provide communication coverage for a particular geographic area. In 3GPP, the term "cell" can refer to this particular geographic coverage area of an eNB and/or an eNB subsystem serving the coverage area, depending on the context in which the term is used.

An eNB 102 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like).

An eNB 102 for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 102a-f are macro eNBs, having corresponding macro cells 104a-f, respectively. The eNB 102g is a pico eNB for a corresponding pico cell. The eNBs 102i-j are femto eNBs serving corresponding femto cells. An eNB may support one or multiple cells.

The wireless network 100 may also include a relay station 103 which may communicate with the eNB 102e and a UE 106e. A relay station may also be referred to as a relay eNB, a relay, network element and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 106 are located throughout the wireless network 100, and each UE may be stationary or mobile. A UE may also be referred to as a terminal, a mobile station, a subscriber unit, a station, network element or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. Furthermore, multiple eNBs may transmit to the same UE at the same time/frequency slot in the form of a joint transmission. Similarly multiple eNBs can receive from the same UE in the same time/frequency slot in the form of a joint reception.

Figure 2:
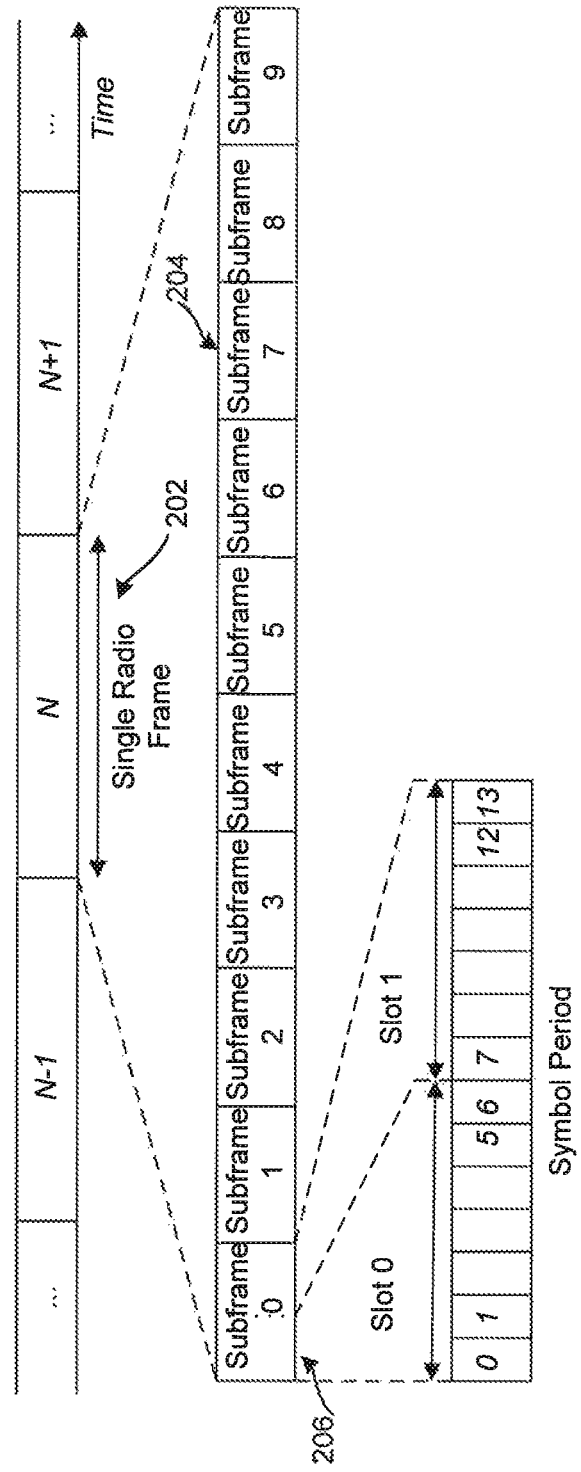
FIG. 2 shows a block diagram conceptually illustrating an example of a frame structure in a wireless communication system.

In the cell based network described above, an example radio frame structure is shown in FIG. 2. A transmission timeline is partitioned into units of radio frames 202. The radio frame 202 may have a predetermined duration (e.g., 10 milliseconds (ms) in the LTE standard) and may be partitioned into ten subframes 204 with indices of 0 through 9. Each subframe 204 may include two slots 206. Each radio frame may thus include 20 slots with indices of 0 through 19. Each slot may include L symbol periods, e.g., 7 symbol periods for a normal cyclic prefix (as illustrated) or 6 symbol periods for an extended cyclic prefix. The 2L symbol periods in each subframe may be assigned indices of 0 through 2L-1. The available time frequency resources may be partitioned into resource blocks (not shown). Each resource block may cover N subcarriers (e.g., 12 subcarriers) in one slot.

The following table lists seven examples of uplink-downlink subframe configurations available in an LTE network supporting TDD operation. Each uplink-downlink configuration indicates whether each subframe is a downlink subframe (denoted as "D"), or an uplink subframe (denoted as "U"), or a special subframe (denoted as "S"). As shown, uplink-downlink configurations 1 through 5 have more downlink subframes than uplink subframes in each radio frame.

| Uplink-Downlink Configuration | Downlink-to-Uplink Switch-point periodicity | Subframe Number n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In current implementations, subframe configurations are not determined by each individual eNB. Subframe configurations are determined from higher levels in the network and passed down to all eNBs in the network (or at least many eNBs that cover a large part of network). The determination is, based on average determined conditions (e.g., inter-cell interference, DL/UL efficiency, DL/UL protection, and the like) of the communication environment experienced within the cell. An appropriate subframe configuration is then selected from the limited number of subframe configurations listed in the table above.

It may be seen from the above that, in existing implementations, such as the conventional LTE, the same subframe configuration is pre-allocated and is shared among a group (typically a large group or even the whole network) of cells throughout a cell or among a collection of neighboring cells in a network. The subframe configuration is determined primarily by the network based on conditions of the communication environment experienced within the whole network. The subframe configuration is used by all UEs and does not take into account the specific needs of a UE, but is rather broadly based on average needs of all the UEs associated to that network or group of cells. The UE has no ability to negotiate its own frame structure to take into account its own needs.

Various aspect of the present disclosure support the ability for a UE or each group of UEs to have its own associated subframe configuration. A UE's subframe configuration is determined by its own needs, based on factors such as DL/UL traffic load ratio of the UE; possible device-to-device (D2D) communication; and the UE's traffic type, which has factors such as delay sensitivity, maximum allowed delay for retransmission(reTX) and burstiness.

Further aspects of the present disclosure support the ability to determine the subframe configuration based on whether DL subframes are to be shared among UEs. For example, DL subframes may be shared in broadcast/multicast channels or in possible DL pilot transmissions for measurement or common control channels.

Further aspects of the present disclosure also provide for each UE to determine its subframe configuration by whether the UE has need-based special subframes. For example, some need-based special subframes may include D2D subframes for inter-UE communications, auxiliary subframes for DL/UL/D2D communication and muted subframes for applications such as IM, measurements, and energy saving.

As may be seen from the description above, a UE-centric transmission time slot configuration (or frame configuration) provides for the creation of virtual full duplex wireless communication between a plurality of TPs and a plurality of UEs, where UEs belonging to the same plurality of UEs or TPs belonging to the same plurality of TPs may communicate in two different directions in a same time resource. In other words, a first UE and a second, adjacent UE may be configured with different time slot configurations (or subframe configurations) so that the first UE transmits on an UL while the second UE receives on a DL, or vice versa, in the same time resource (typically in one or more transmission time intervals (TTI)).

Reference is now made to FIG. 3, which shows a process diagram 300 illustrating example blocks executed by a network element to implement one aspect of the present disclosure. At block 302, a request is received at the network element for a new subframe configuration for use with a radio transmission in frame based time division duplex communication. The new subframe configuration may be associated with a specific UE or group of UEs (as explained below).

The request of block 302 may be based on characteristics of the requesting UE, including but not limited to a DL/UL traffic load ratio of the UE; possible D2D communication; and the UE's traffic type such as delay sensitivity, maximum allowed delay for retransmission (reTX) and burstiness.

The process next proceeds to block 304, in which the network element negotiates potential subframe configurations, taking into account factors such as, but not limited to, potential interference with subframe configurations of other UEs; a difference in the interference level experienced with different subframe configurations; interference at the requesting UE; an interference type; current interference mitigation; and cooperation with neighboring UEs, TPs or groups of UEs and groups of TPs.

The process then proceeds to block 306, in which a subframe configuration is determined by the network element for the requesting UE and associated to the requesting UE. The determined subframe configuration may be, for example, a sequence of subframe types selected from one or more of DL subframes, UL subframes, shared UL or DL subframes, special subframes such as D2D subframes for inter-UE communications, auxiliary subframes for DL/UL/D2D communication and muted subframes.

The process then proceeds to block 308, in which an indication of the subframe configuration to be used may be communicated to the requesting UE. The communication of block 308 may be a broadcast or unicast communication, and provide the new subframe configuration to the UE. In the present disclosure, the network element may be an eNB, a UE or any other processing node.

Reference is now made to FIG. 4, which shows a process diagram 400 illustrating example blocks executed to implement one aspect of the present disclosure. Although the UE is described with reference to subframe configurations, this is merely an example of the general time slot configuration described above. Thus the term time slot may be substituted for the term subframe. At block 402 a UE determines it needs a new subframe configuration based on specific needs.

The process next proceeds to block 404, in which a UE requests a subframe configuration from a negotiating center (alternatively termed a central control unit (CCU) or central controller) which may for example be a network element implementing the process blocks 300 described in FIG. 3. For example the CCU could be an eNB, UE, or any other dedicated terminal in the network or a combination of the above.

The UE may, along with the request, provide factors specific to the UE to be evaluated in determining a subframe configuration. These factors may include, but are not limited to, DL/UL traffic load ratio of the UE; possible D2D communication; and the UE's traffic type such as delay sensitivity, maximum allowed delay for retransmission (reTX), burstiness, and interference.

The process next proceeds to block 406, in which the UE receives an indication of the new subframe configuration to be used from the negotiating center (or CCU).

The process then proceeds to block 408, in which the UE uses the new subframe configuration.

The functional blocks and modules in FIGS. 3 and 4 may be implemented by processors, electronics devices, hardware devices, electronics components, logical circuits, memories, software codes, firmware codes, etc., or any combination thereof. The above functionality may be implemented on any one or combination of network elements. In some cases members of a group of UEs may comprise UEs from different, and possibly, adjacent cells.

Figure 5:
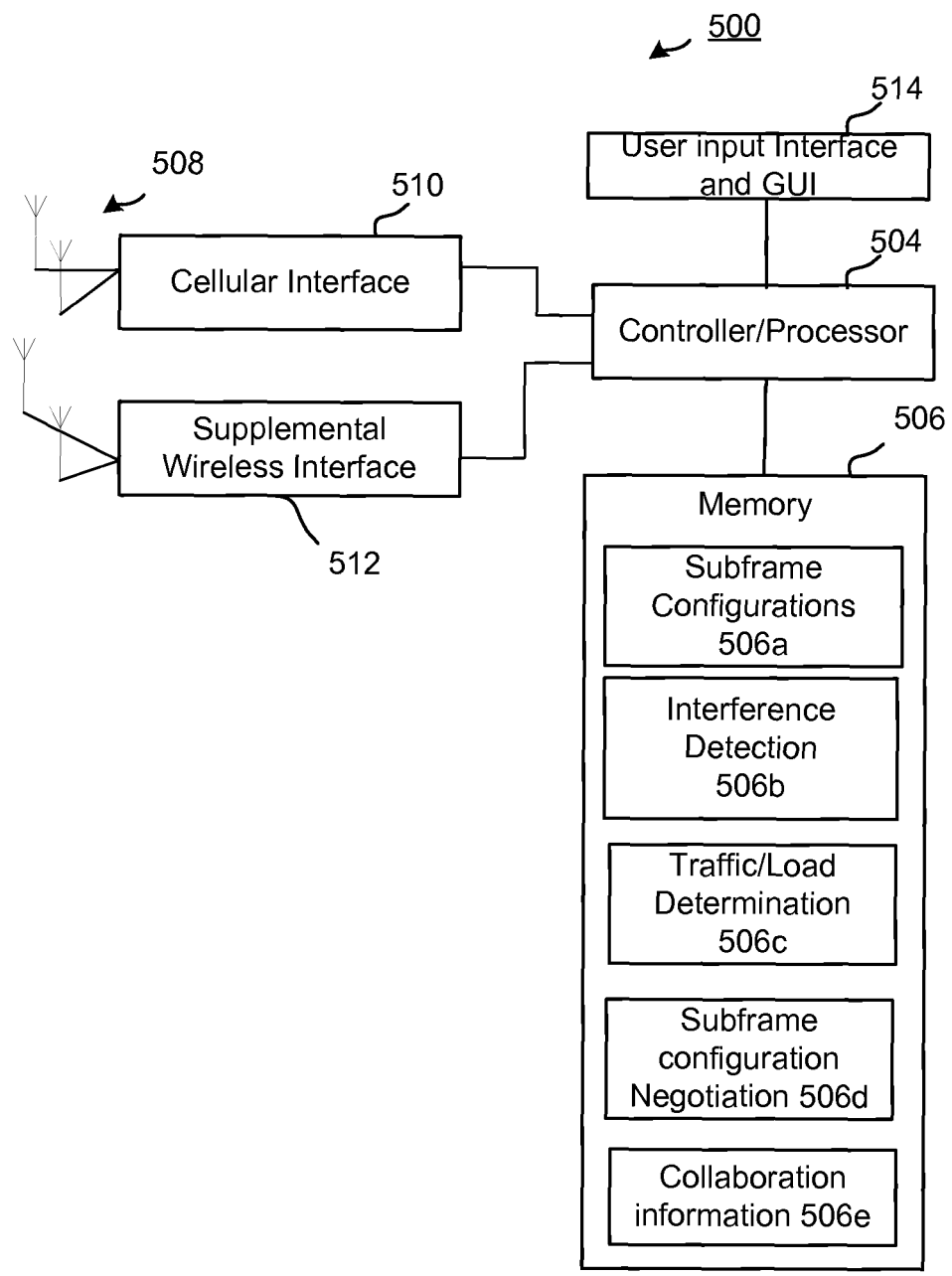
FIG. 5 shows a UE configured according to another aspect of the present disclosure.

Reference is now made to FIG. 5, which shows a UE 500 configured according to one aspect of the present disclosure. Although the UE is described with reference to subframe configurations, this is merely an example of the general time slot configuration described above. In other words the term time slot may be substituted for the term subframe. The UE 500 includes controller/processor 504 that controls the various components and executes any software or firmware in memory 506 that is used to operate the functionality and features of UE 500. The UE 500 may also include a user input interface (such as a keyboard) and graphical user interface (such as a display) 514. UE 500 receives information from a serving base station or serving base stations (the UE may receive signals in the form of, for example, joint transmissions) with regard to the current configuration applicable to the subframes of radio transmissions (or time slot configurations). Such signals may be received by UE 500 over antennas 508, served by cellular interface 510 or supplemental wireless interface 512. Under control of controller/processor 504, the signals are decoded to receive the information for the subframe configuration.

Controller/processor 504 accesses memory 506 to determine the specific subframe configuration signaled by the base station, negotiating center, or CCU as the case may be. The signal will trigger controller/processor 504 to apply a subframe configuration from one of the available configurations stored in subframe configurations table 506a. Alternatively, the signal could trigger the controller/processor to update the subframe configuration.

The UE 500 may also include subframe configuration (or time slot) negotiation and determination logic 506d for determining if a new subframe configuration is needed by the UE. Accordingly, UE 500 under control of controller/processor 504 may execute subframe configuration negotiation and determination logic 506d stored in memory 506, in order to determine whether a new subframe configuration is required. The logic 506d may implement the functional blocks, as for example, described with reference to FIG. 4.

The UE 500 may also include traffic and load determination logic 506c for determining one or more of DUUL traffic load ratio of the UE; possible D2D communication; and the UE's traffic type such as delay sensitivity, maximum allowed delay for retransmission (reTX), and burstiness. The load determination logic 506c may also determine the number DL subframes, UL subframes, shared UL or DL subframes, special subframes such as D2D subframes for inter-UE communications, auxiliary subframes for DL/UL/D2D communication, and muted subframes. Accordingly, UE 500 under control of controller/processor 504 may execute traffic and load determination logic 506c stored in memory 506, in the determining of whether a new subframe configuration is required.

The UE 500 may also include interference detection logic 506b which may be used in determining if a new subframe configuration (or time slot configuration) is needed. Accordingly, UE 500 under control of controller/processor 504 may execute interference detection logic 506b, stored in memory 506, in order to detect interference on one or more subframes within the same frame. Interference may be detected based on signals received over antennas 508 at the UE or from interference indicators from other UEs or eNBs in the communication environment. Any combination of these interferences may provide means for determining by the UE a need for a new subframe configuration.

The UE 500 may also include collaboration information and collaboration logic 506e for implementing virtual full duplex wireless communication between a plurality of TPs and a plurality of UEs.

Figure 6:
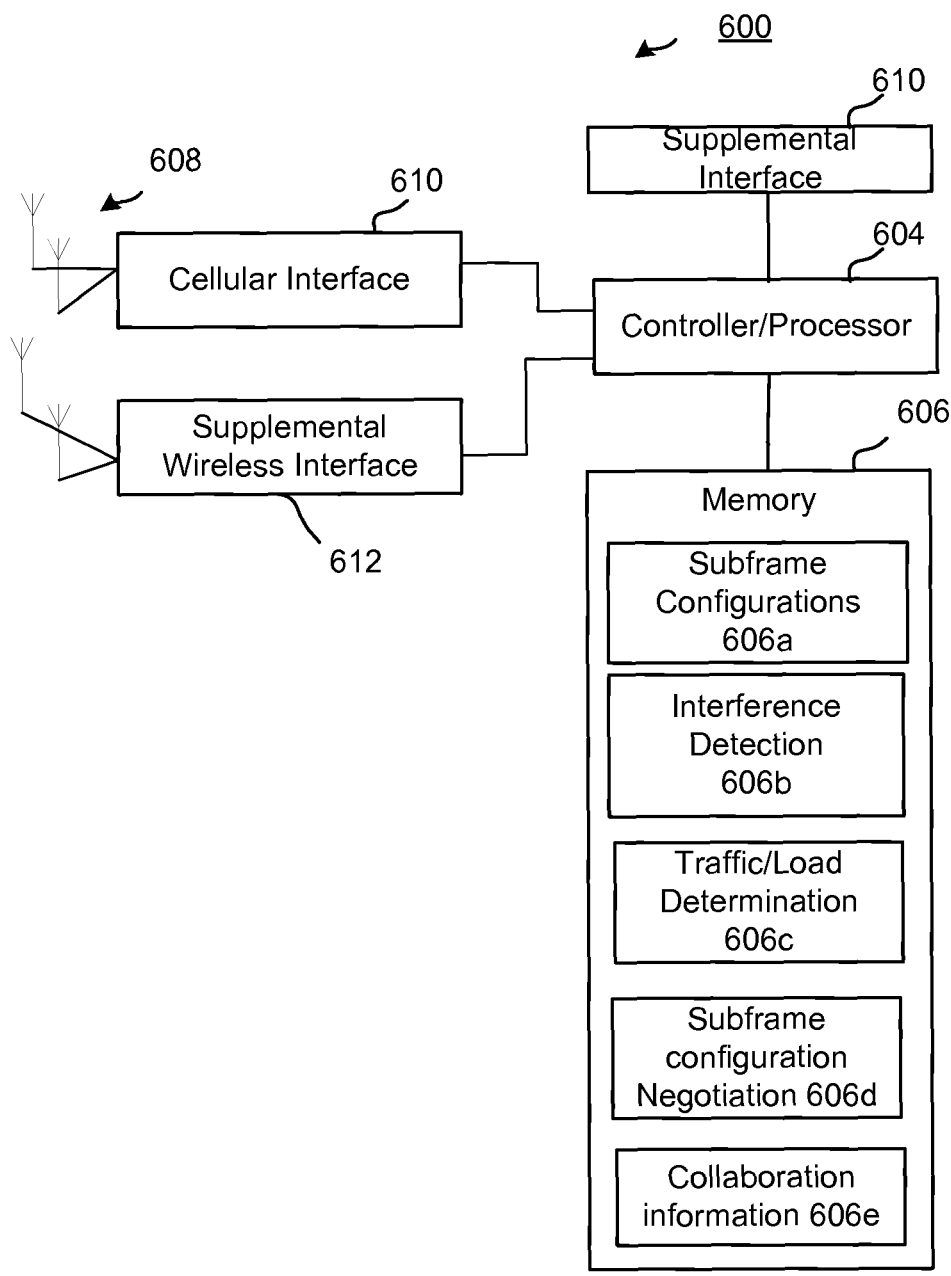
FIG. 6 is a block diagram illustrating a transmit point (TP) configured according to another aspect of the present disclosure.

Referring to FIG. 6, the figure shows a block diagram illustrating an eNB 600 configured according to one aspect of the present disclosure. Although the eNB is described with reference to subframe configurations, this is merely an example of the general time slot configuration described above. In other words the term time slot may be substituted for the term subframe. The eNB 600 includes controller/processor 604 that controls the various components and executes any software or firmware in memory 606 that is used to operate the functionality and features of eNB 600 under control of controller/processor 604, eNB 600 determines which subframe configuration to apply to the radio transmission frames of a specific UE.

The eNB according to the present disclosure operates so that when interference has been detected or signaled to the eNB from a victim UE or TP, the eNB 600, under control of controller/processor 604, accesses memory 606 to select a different UE or TP from collaboration or cluster information 606e stored in memory. The newly selected UE or TP is used to relay the appropriate DL data to a victim UE or victim TP in order to mitigate the detected or signaled interference. Furthermore, the collaboration or cluster information 606e may be used by the eNB in implementing virtual full duplex wireless communication with other collaborating eNBs or cluster eNBs.

Controller/processor 604 accesses memory 606 to determine the specific subframe configuration to be signaled by the base station, negotiating center, or CCU, as the case may be. The signal will trigger controller/processor 604 to provide subframe configuration information for the requesting or instructed UE or TP from one of the available configurations stored in subframe configurations table 606a. Alternatively, the signal could trigger the controller/processor to update the subframe configuration with the new determined subframe configuration, including an association linking the subframe to one or more of a specific UE, VUE, TP or VTP.

The eNB 600 may also include interference detection logic 606b which may be used in the determining of a new subframe configuration when one is needed. Accordingly, eNB 600 under control of controller/processor 604 may execute interference detection logic 606b, stored in memory 606, in order to detect interference on one or more subframes within the same frame. Interference may be detected based on signals received over antennas 608, 612 at the eNB or from interference indicators from UEs or TPs in the communication environment. Any combination of these interferences may provide means for determining by the eNB a new subframe configuration for a UE.

The eNB 600 may also include traffic and load determination logic 606c for processing traffic load information obtained from specific UEs and determining a DL/UL traffic load ratio of a UE, the eNB or other groups of UEs and/or eNBs; possible D2D communication; and traffic type such as delay sensitivity, maximum allowed delay for retransmission (reTX), or burstiness. The load determination logic 606c may also determine the number of DL subframes, UL subframes, shared UL or DL subframes, special subframes such as D2D subframes for inter-UE communications, auxiliary subframes for DL/UL/D2D communication, and muted subframes. Accordingly, eNB 600, under control of controller/processor 604, may execute traffic and load determination logic 606c stored in memory 606, in determining a new subframe configuration for a UE, group of UEs, TPs or group of TPs. The traffic and load determination block may also store load information for UEs, TPs, VUEs and VTPs in the network within memory 606.

The eNB 600 may also include subframe configuration negotiation and determination logic 606d for determining a new subframe configuration needed by the UE. Accordingly, eNB 600, under control of controller/processor 604, may execute subframe configuration negotiation and determination logic 606d stored in memory 606, in order to determine the new subframe configuration required. The logic 606d may, for example, implement the process described above with reference to FIG. 3.

In the description below, reference is made to subframe configurations as a specific example or implementation of the more general sequence of time slots as disclosed herein. While reference is made to radio transmissions composed of subframe configurations in the below examples, it is to be remembered that the description is equally applicable to radio transmissions having a configuration of resource units in transmission time slots as described above. Furthermore, in the examples below, communication between UEs and TPs, UEs and UEs, or TPs and TPs are not restricted to traditional cell based architecture as described with reference to FIG. 1 above, although the description below may also be applied to traditional cell based communications.

Figure 7:
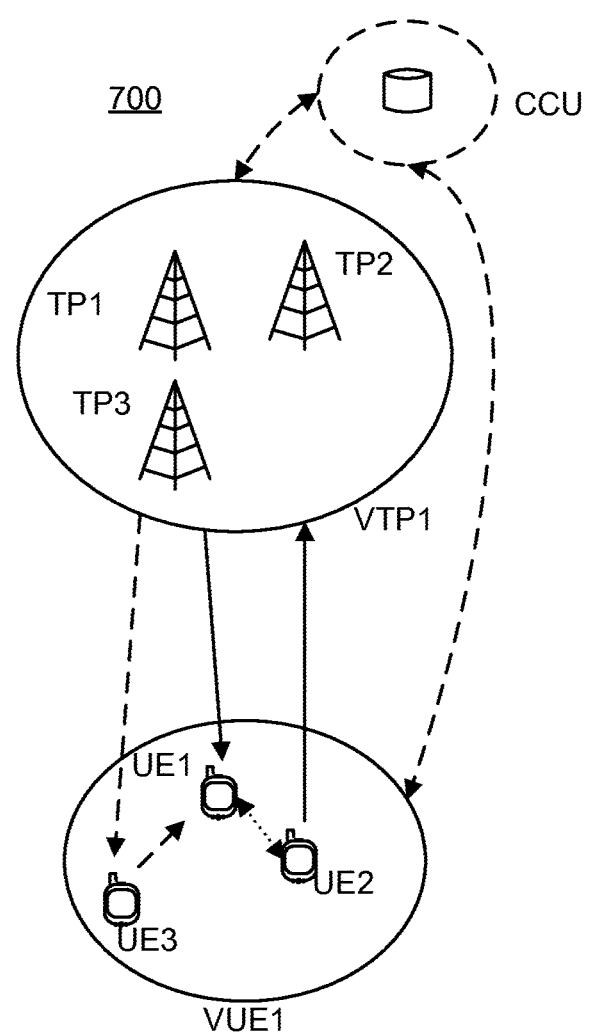
FIG. 7 shows schematically a virtual full duplex TDD communication configuration according to another aspect of the present disclosure.

Reference is now made to FIG. 7, which shows schematically a virtual full duplex TDD communication configuration 700 according to one aspect of the present disclosure. A group of TPs, designated as VTP1, is shown serving a group of UEs, designated as VUE1. The TPs in VTP1 and the UEs in VUE1 cooperate and collaborate. In this configuration, it is assumed that at least two UEs (e.g. UE1 and UE2) in VUE1 have different subframe configurations.

Thus, for example, if UE1 is receiving in a DL subframe while UE2 is transmitting in an UL subframe in the same time resource, virtual full duplex can be achieved. In other words, the VTP serves neighboring UEs in conflicting directions using different TPs.

Furthermore, cooperation/interference management may be implemented in configuration 700 among TP members of VTP1, for example using a backhaul connection among those VTP1 members and using a central coordinator unit (CCU) that has the knowledge (subframe configurations, DL/UL load, interference reports) of members of both VTP1 and VUE1. Thus, the VTP has freedom in selecting the TP used to coordinate both inter and intra layer interference. As illustrated, the CCU is shown outside the VTP. However, the CCU could be implemented in a TP or even in a UE.

A consequence of implementing UE centric subframe configurations with collaboration may be better understood as follows. If the DL transmission of UE1 (victim) experiences interlayer interference from the UL of UE2 in the configuration 700, then a TP in VTP1 may use another UE in VUE1, (e.g. UE3) to transmit the subframe data to UE1 (e.g. on a different frequency in a device-to-device (D2D) subframe). Thus, the subframe configuration of UE3 may be dynamically changed (e.g. by the TP or CCU) to allow for the transmission of subframe data to UE1 and thereby to mitigate the interference of the victim UE (UE1), i.e. implement interference rejection at the victim UE.

The VUE according to the present disclosure has a number of characteristics, namely the ability to implement interference rejection at a victim UE, enabling of inter and intra-layer interference mitigation using UE cooperation and controlling communication of a UE with the network in a desired direction using UE cooperation.

Figure 8:
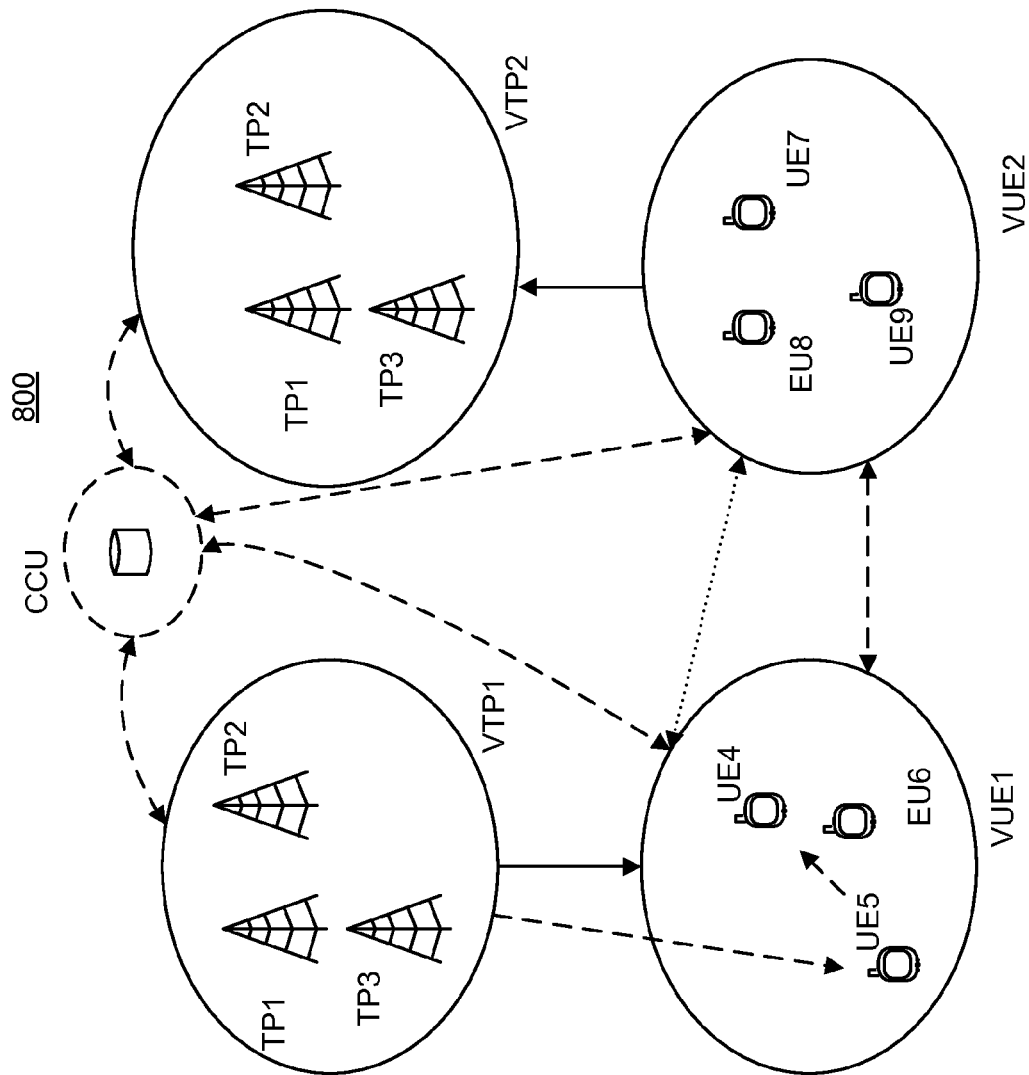
FIG. 8 shows schematically a further virtual full duplex TDD communication configuration according to another aspect of the present disclosure.

Reference is made to FIG. 8, which schematically shows a further virtual full duplex TDD communication configuration 800 according to an aspect of the present disclosure. In the configuration 800 two groups of virtual UEs e.g. VUE1 and VUE2 communicate with their corresponding virtual TPs, VTP1 and VTP2 respectively.

Again, as in configuration 700 above, in configuration 800 it is assumed that VUE1 and VUE2 have different subframe configurations. In this case, if the UEs of VUE1 receive in a DL subframe while the UEs of VUE2 are transmitting in an UL subframe in the same time resource, virtual full duplex can be achieved. Again, as mentioned earlier, cooperation and interference management may be implemented in the configuration 800 among VTP1 and VTP2, by using, for example, a backhaul connection and using a central coordinator unit (CCU) that has the knowledge (subframe configurations, DL/UL load, interference reports) of members of VTP1, VTP2, VUE1 and VUE2. As illustrated, the CCU is shown outside the VTPs. However, the CCU could be implemented in a TP or even be a UE.

In configuration 800, if interlayer interference is experienced in, for example, UE4 (victim) in VUE1, the TP may change the subframe configuration of UE5 to communicate with UE4 to mitigate interference at UE4.

Figure 9:
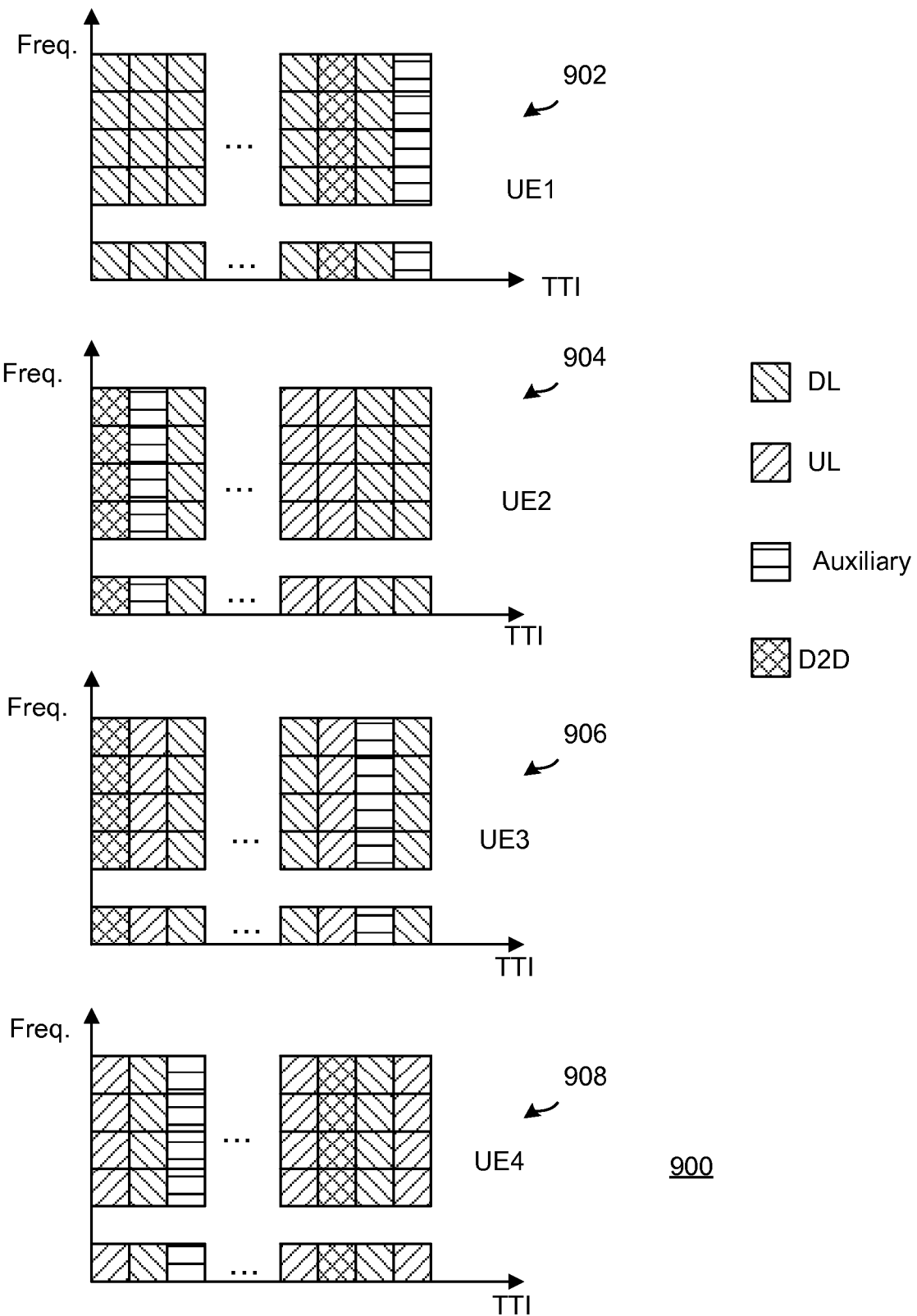
FIG. 9 graphically illustrates examples of customized subframe configurations according to another aspect of the present disclosure.

FIG. 9 graphically illustrates examples of customized subframe configurations 900 according to one aspect of the present disclosure. In the configuration 900, four neighboring UEs are shown as UE1-UE4, each with a respective different subframe configuration 902, 904, 906 and 908. Each UE's frame can be a customized combination of DL, UL, D2D, auxiliary, and muted subframes. For example, the subframe configurations of UE1 and UE2 differ in the first two subframes. UE1 has its first two subframes as DL subframes, while UE2 has a D2D subframe and an auxiliary subframe as its first two subframes. Similarly, UE3 has a downlink subframe while UE4 has an uplink subframe in the same TTI.

Figure 10:
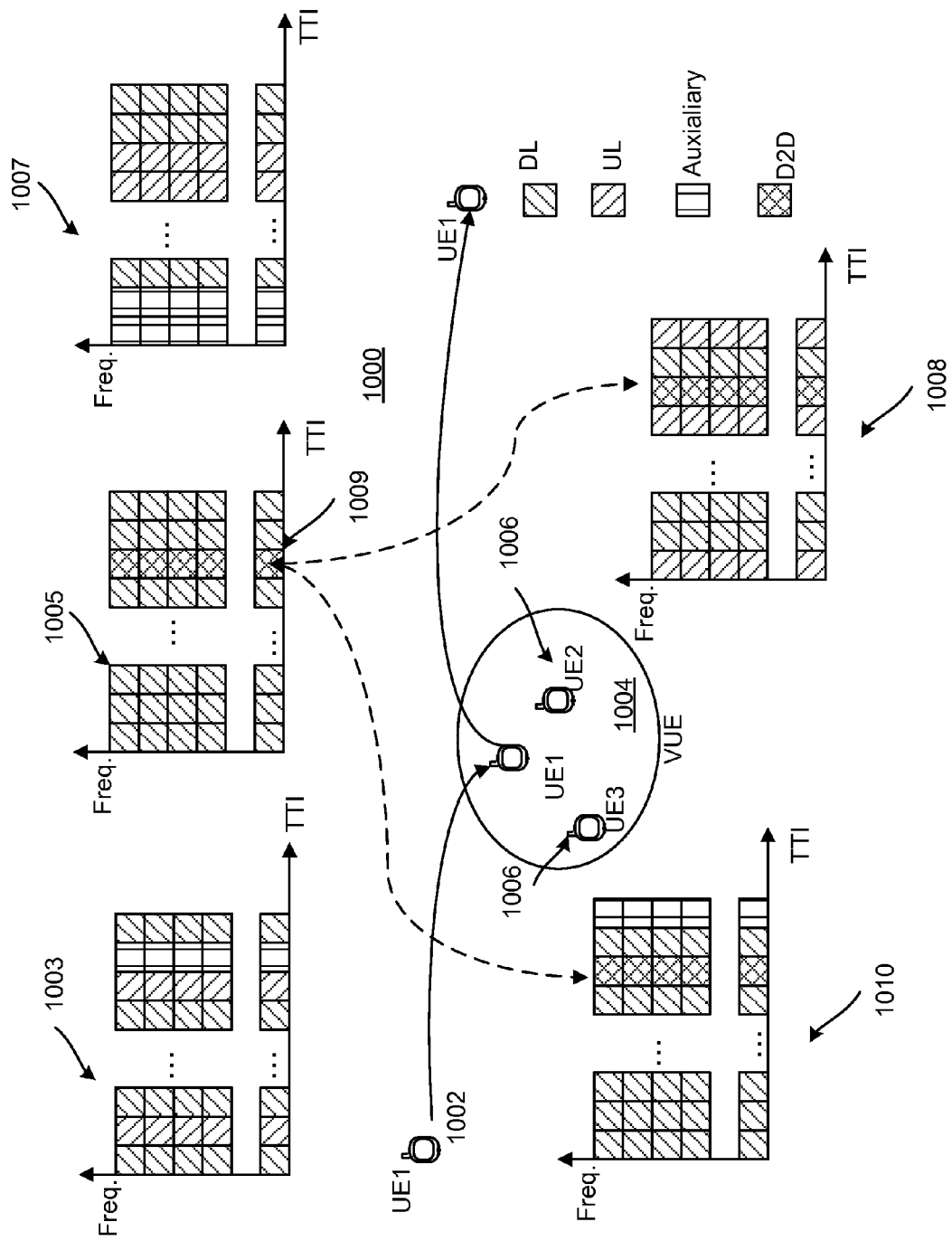
FIG. 10 graphically illustrates an example application according another aspect of the present disclosure.

FIG. 10 graphically illustrates a configuration 1000 according to the present disclosure, showing how a subframe configuration of each UE can dynamically change based on its needs. For instance, UE1 1002 is shown initially at a first position and has a subframe configuration 1003. When the UE1 1002 moves into a VUE 1004, it may send a request to the eNB, CCU or negotiating center (not shown) requesting a new subframe configuration so that UE1 may participate in, for example, D2D communication with the UEs in the VUE. Accordingly, a TTI of the D2D subframe of the UEs in the VUE is determined (either already known to the eNB or requested from the VUE). A new subframe configuration 1005 is assigned to UE1 1002. For example, UE2 1006 has a subframe configuration 1008, and UE3 1009 has a subframe configuration 1010. Subframe configuration 1005 now shares a D2D subframe at TTI 1009 with the subframe configurations 1008 and 1009 of VUE members UE2 1006, and UE3 1009 in the same TTI. Accordingly, a cell-centric channel for D2D does not have to be allocated to UE1 1002. In other words, UE1 1002 may maintain all its previous subframes with the exception of the new D2D subframe. Once UE1 1002 leaves the VUE, a further subframe configuration 1007 may be requested and assigned.

Figure 11:
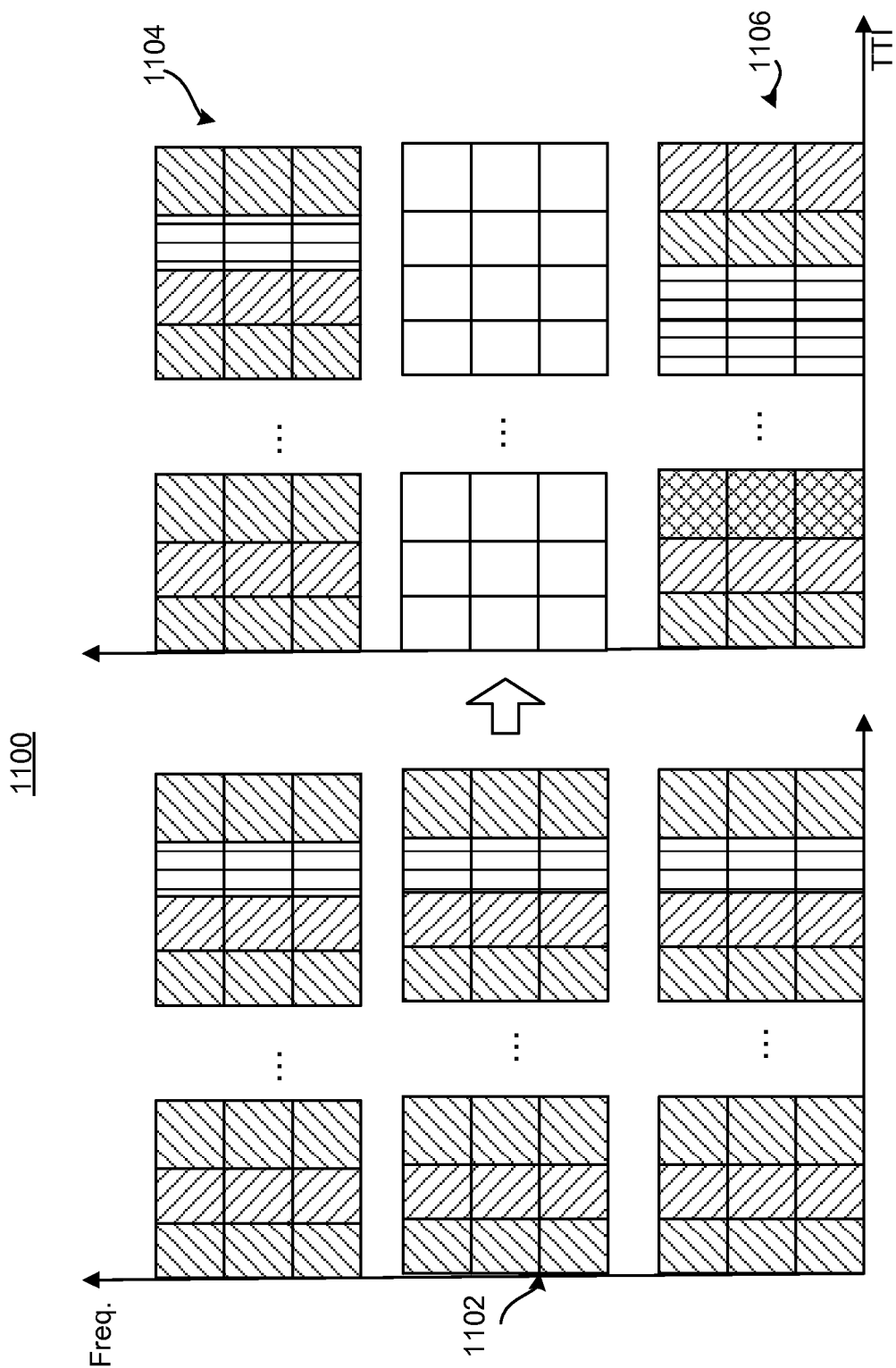
FIG. 11 graphically illustrates an example application according another aspect of the present disclosure.

FIG. 11 graphically illustrates a configuration 1100 according to the present disclosure. In the configuration 1100, if a middle frequency band 1102 of a UE is shut off, for example for IM or energy saving, then the neighboring bands 1104, 1106 can switch to two different subframe configurations.

Based on the above, according to aspects of the present disclosure, the subframe configurations of each UE can change as the UE's traffic load, type, or inter-UE communication status changes. This subframe structure could be changed using higher layer signaling.

Furthermore, in regular non-CA or contiguous CA scenarios, every TP and UE can communicate in half duplex. However, the present UE centric subframe configuration enables a virtual full duplex communication between a group of cooperative TPs (virtual TP; VTP) and a group of cooperating UEs (virtual UE or VUE). On the other hand, in non-contiguous CA scenarios with sufficiently large inter-carrier distance, the UE subframe configuration at each frequency band can be different. Of course, for virtual full-duplex communication, tighter cooperation and IM (due to the additional inter-layer interference) may need to be implemented. Following elements may be used toward fulfilling this requirement Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible medium such as optical (e.g., CD, DVD, Blu-Ray, etc.), magnetic, hard disk, volatile or non-volatile memory, solid state memory, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method of simultaneous bidirectional transmissions, said method comprising:
   determining, by a network element, first transmission time slots for downlink (DL) and uplink (UL) transmissions for a first plurality of user equipment (UEs), said first transmission time slots are associated with a first timeslot configuration for a first UE in said first plurality of UEs, and a second timeslot configuration for a second UE in said first plurality of UEs;
   assigning, according to said first timeslot configuration, a DL transmission to a first shared time slot of said first transmission time slots for said first UE in said first plurality of UEs; and
   assigning, according to said second timeslot configuration, an UL transmission to said first shared time slot for said second UE in said first plurality of UEs,
   wherein said first and second timeslot configurations are determined based on respective needs of said first and second UEs.

2. The method of claim 1, including providing to a first transmission point (TP) and a second TP in a first plurality of TPs, said determined first transmission time slots for use by said first TP in transmitting a DL signal to said first UE in said first shared time slot assigned for DL transmission and for use by said second TP in receiving an UL signal in said first shared time slot from said second UE.

3. The method of claim 2, including providing said determined first transmission time slots to said first plurality of UEs.

4. The method of claim 2, including monitoring collaboration between said first TP and said second TP.

5. The method of claim 2, including monitoring said first TP and said second TP to coordinate interference mitigation (IM) between said first UE and said second UE.

6. The method of claim 1, including designating a first TP and a second TP in a first plurality of TPs to collaborate in said assigned UL and assigned DL transmission.

7. The method of claim 1, including coordinating interference mitigation (IM) between said first UE and said second UE.

8. The method of claim 1, including determining second transmission time slots for DL and UL transmissions for a second plurality of UEs wherein at least one time slot in said second transmission time slots is shared with a time slot in said first transmission time slots of said first plurality of UEs.

9. The method of claim 8, including:
assigning a DL transmission to said shared time slot for said second plurality of UEs; and
assigning an UL transmission to said shared time slot for said first plurality of UEs.

10. The method of claim 9, including providing said second transmission time slots to said second plurality of UEs.

11. The method of claim 10, including coordinating interference mitigation (IM) between said first plurality of UEs and said second plurality of UEs.

12. The method of claim 8, including providing to a second plurality of TPs, said determined second transmission time slots for use by said second plurality of TPs in communicating with said second plurality of UEs.

13. The method of claim 12, including monitoring collaboration between said first plurality of TPs and said second plurality of TPs.

14. The method of claim 12, including coordinating interference mitigation (IM) between said first plurality of TPs and said second plurality of TPs.

15. The method of claim 1, wherein the respective needs of said first and second UEs comprising at least one of respective down link to uplink (DL/UL) traffic load ratios of said first and second UEs, respective device-to-device (D2D) communications with other UEs of said first and second UEs, respective traffic types of said first and second UEs, and respective factors relating to interference of said first and second UEs.

16. The method of claim 15, including determining time slots for:
one or more of broadcast or multicast channels;
pilot transmissions for DL measurement; and
common control channels.

17. The method of claim 15, including determining special time slots selected from one or more of device-to-device (D2D) time slots for inter UE communication, auxiliary time slots for DL/UL/D2D communication, and muted time slots for interference mitigation (IM), measurements and power saving.

18. The method of claim 15, wherein the factors relating to interference comprises a potential interference with subframe configurations of other UEs, a difference in the interference level experienced with different subframe configurations, an interference at the first and second UEs, an interference type, a current interference mitigation, and a cooperation with neighboring UEs, TPs or groups of UEs and groups of TPs.

19. The method of claim 1, wherein said traffic types are selected from one or more of delay sensitivity of communicated data, maximum allowed delay for retransmission (reTX) and burstiness.

20. The method of claim 1, wherein said network element is a central controller in said network.

21. The method of claim 1, wherein said network element is a transmission point.

22. The method of claim 1, wherein said network element is a UE.

23. The method of claim 1, wherein said network element maintains information about transmissions between UEs and transmission points.

24. The method of claim 1, wherein said first and second UEs form a virtual UE to communicate in virtual full duplex in at least said first shared time slot.

25. The method of claim 1, wherein the determining first transmission time slots for DL and UL transmissions for said first plurality of UEs based on whether said DL transmissions are to be shared among said first plurality of UEs.

26. The method of claim 1, wherein the first transmission time slots comprise a sequence of subframe types selected from one or more of DL subframes, UL subframes, shared UL or DL subframes, special subframes, auxiliary subframes for DL/UL/D2D communication and muted subframes.

27. The method of claim 1, further comprising, communicating, by the network element, an indications of each of the first transmission time slots to be used to each of the corresponding first plurality of UEs.

28. The method of claim 1, further comprising each of the first plurality of UEs requests a time slot configuration from a negotiating center.

* * * * *